United States Patent
Kögler et al.

(10) Patent No.: US 6,716,377 B1
(45) Date of Patent: Apr. 6, 2004

(54) USE OF PLASTIC FOAMS CONTAINING SWELLABLE FILLERS FOR SEALING WALL CHANNELS

(75) Inventors: Markus Kögler, Buchloe (DE); Franz Heimpel, Affing (DE); Silvia Huber, Neusäss (DE); Peter Vogel, Untermeltingen (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/715,605

(22) Filed: Nov. 17, 2000

(30) Foreign Application Priority Data

Nov. 19, 1999 (DE) .......................... 199 55 839

(51) Int. Cl.$^7$ .............................. B29C 65/00
(52) U.S. Cl. .................. 264/35; 264/45.3; 264/46.5; 521/97; 521/130
(58) Field of Search ............. 521/130, 97; 264/35, 264/45.3, 46.5

(56) References Cited

U.S. PATENT DOCUMENTS 4,449,713 A * 5/1984 Ishido et al. ............ 277/1
5,026,780 A * 6/1991 Takizawa et al. .......... 525/301

FOREIGN PATENT DOCUMENTS

| DE | 3623552 | 10/1987 |
| DE | 4211302 | 10/1993 |
| DE | 4242236 | 2/1994 |
| DE | 19748631 | 5/1999 |
| EP | 0453286 | 10/1991 |

OTHER PUBLICATIONS

Rees, R. "Ionomers" Kirk–Othmer Encycopedia of Chemical Technology, John Wiley & Sons: 1995, online posting date Dec. 4, 2000.*

PAJ Pub. No. 09–111899 to Nitto Denko Corp., Apr. 1997, Japanese version and machine translation.*

* cited by examiner

Primary Examiner—Samuel A. Acquah
Assistant Examiner—Melanie Bissett
(74) Attorney, Agent, or Firm—Sidley Austin Brown & Wood, LLP

(57) ABSTRACT

The use of a plastic foam system, which contains at least one filler capable of swelling in the presence of water, for sealing openings in buildings, which are in contact with the outside, especially wall, floor and ceiling channels of pipes and/or cables.

6 Claims, No Drawings

USE OF PLASTIC FOAMS CONTAINING SWELLABLE FILLERS FOR SEALING WALL CHANNELS

FIELD OF INVENTION

The present invention relates to the use of a plastic foam system, which contains at least one filler, capable of swelling in the presence of water, for sealing openings in buildings, which are connected to the outside, especially for sealing house lead-ins, for which the pipes or cables are passed through openings in walls, floors or ceilings from the outside into the interior of the building.

BACKGROUND INFORMATION AND PRIOR ART

Conventionally, the annular gap between pipes, cables or the like and walls, floors or ceilings, through which the pipes or cables are passed, are sealed with the help of very different methods, such as a mechanical sealing, chemical sealing and combinations thereof.

In the case of mechanical sealing, solid sealing elements are introduced into the gap and bring about a sealing by a form-fitting adaptation by an elastic press compaction with the substrate. In the case of chemical sealing, the opening remaining, between the pipe and/or cable and the wall or the ceiling, is filled with reactive systems, which cure and close off the opening. For this purpose, inorganic systems (such as a mortar) or organic systems, such as sealing compositions, polymer compositions, sealing foam, etc. can be used. In the case of combined chemical and mechanical sealing, mechanical formwork usually is put in place first and chemical sealing material is introduced into this formwork in accordance with the systems described above.

These conventional methods are not completely satisfactory, since mechanical solutions are expensive, time-consuming and work-intensive to install and are limited to particular pipe diameters, cable thicknesses and borehole diameters. Chemical sealing, which acts by filling the remaining openings with sealing composition, foams or mortar, does not have this disadvantage; however, it does not generally guarantee a permanent seal against the entry of water. This is a problem particularly in the case of wall and ceiling channels, which are connected to the outside and exposed to the weather. This is frequently due to the permeability of the material itself (open cell foams) and to the deficient adhesion of these chemical sealing compositions to different critical substrates, such as plastic surfaces of pipes and/or cables.

From the DE-A-197 48 631, a method for sealing is already known for preventing the exit or entry of liquids out of or into systems which, in a space separating two systems from one another, has a polymer, which is not decomposed biologically and is capable of swelling by adsorbing liquids, or at least two components, reactively forming such a polymer. In particular, the polymer is present as a powder in a biologically decomposable tube, such as a paper tube, or is applied on fibers, so that the woven, knitted or nonwoven material can be used as a seal. This seal preferably is downstream from a conventional seal in a connecting sleeve or is present in the form of a double sheet for sealing landfills, the swellable polymer being introduced between the two sheets. This seal is an embodiment of the chemical/mechanical sealing addressed above which, because of the necessary adaptation to the sealing regions of the connecting sleeves or of the sheets at the substrate, which is to be sealed, is time-consuming and labor intensive and usually must be kept and installed in the form of suitably shaped sealing products.

The EP-A-0 453 286 discloses a super-absorbing foam composition, which is produced by reacting at least one polyol with at least one polyisocyanate under foam-forming conditions in the presence of at least one polymeric, super-absorbing material. The presence of the super-absorbing material increases the absorptive capacity of the foam. However, this publication merely describes the use of this super-absorbing material as a growth medium for raising plants.

OBJECT OF THE INVENTION

It is an object of the present invention to overcome the problems of the above-addressed conventional seals for the annular gaps between pipes and/or cables and the corresponding channels through walls, floors or ceilings of buildings.

SUMMARY OF THE INVENTION

Pursuant to the invention, this objective is accomplished by the use according to claim 1. The independent claims relate to preferred embodiments of this object of the invention The object of the invention therefore is the use of a plastic foam system, which contains at least one filler, capable of swelling in the presence of water and referred to below as water-swellable filler, for sealing openings in buildings, which are connected to the outside, especially for sealing wall and ceiling channels of cables, pipes and the like.

Preferably, pursuant to the invention, a water-swellable polymer is used as filler, capable of swelling in the presence of water. Water-swellable polymers of this type are known, for example, from the DE-A-197 48 631. Particularly preferred are water-swellable polymers in the form of homopolymers or copolymers based on (meth)acrylic acid, (meth)acrylamides and/or (meth)acrylates. Any monomers, which are capable of copolymerizing with the monomers addressed above and do not affect the swelling capability of the copolymer, can be used in the copolymer. Preferred co-monomers are acrylonitrile, acrylates, acrylamides, allyl compound, vinyl acetate, hydroxyethylcellulose, hydroxypropylcellulose, carboxymethylcellulose, carboxypropylcellulose and salts thereof (such as sodium salts), as well as guar-galactomannan derivatives and the like. Especially preferred are polyacrylic acids, which can be obtained commercially under the name of "Cabloc", preferably are cross linked and are present in a partially neutralized form, particularly in the form of the sodium salts. Especially preferred products of this type are the products Cabloc CT, Cabloc CTF and Cabloc C96 of the chemical Fabrik Stockhausen GmbH, D47805 Krefeld.

The swellable polymer, used pursuant to the invention, is present in the plastic foam system used as sealing material. The plastic foam system can be one of the conventional foam systems, which are used in the building industry primarily as an installation foam. Especially preferred are one-component polyurethane foams, two-component polyurethane foams, two-component polyurethane aerosol can foams and two-component epoxide resin foams. The one-component polyurethane foams preferably are present in the form of an isocyanate group-containing pre-polymer in an aerosol spray can or cans, from which the components of the polyurethane foam is or are expelled under the action of the driving gas pressure of the blowing agent. The two-component polyurethane foams or two-component epoxide foams preferably are present in cartridges, the binder component and the curing agent component being present in different cartridges. The components, together with the remaining components, are expelled under pressure either by a blowing agent in the case of aerosol can foams, or by mechanical expulsion, and mixed in a static mixer, after which the mixture is introduced into the opening that is to be sealed, where it foams and/or cures. Pursuant to the invention, silicone foam systems can also be provided with the swellable polymers and used for the claimed application.

The plastic foams, which are to be used pursuant to the invention, can be open-cell or closed-cell foams. These pore forms are familiar to the expert and can be produced selectively in the foams by choosing the appropriate components. In this connection, the open-cell plastic foams are particularly preferred, because surprisingly it has turned out that, contrary to their anticipated larger porosity, they are significantly better than closed-cell foams in sealing the annular gap, which can never be quite avoided in the contact region between the plastic foam and the surface of the wall, floor or ceiling, or in sealing the openings, through which pipes, cables, pipelines, etc. are passed, if these devices, which are passed through the openings, have plastic surfaces of, for example, polyethylene, polypropylene or the like, which under normal circumstances exhibit only poor adhesion to the plastic foams in question.

The plastic foam system, which is used pursuant to the invention, contains the filler, which can swell in the presence of water, in an amount of 1 to 40% by weight, preferably of 5 to 30% by weight and particularly in an amount of 10 to 20% by weight, based on the weight of all the components of the plastic foam system.

In implementing the present invention, the components of the plastic foam systems, which contain filler that can swell in the presence of water, are produced in the usual manner, that is, the opening in the wall is foamed in situ with the foam system with the help of a foam dispenser or in a different manner. The foamed and cured foam fills the whole of the opening. Because of the foaming of the plastic foam system, a certain contacting pressure is already exerted by the foaming composition on these surfaces, which are to be sealed. Upon contact with water, such as the moisture of the surroundings, the swellable filler swells and a surprisingly large increase in volume takes place in the contact area, as a result of which further access of moisture into the cell structure of the foam is prevented, as is the passage of moisture through the annular gap between the contact surfaces of the plastic foam and the surfaces of the pipes or cables or of the masonry, because even in these cases, by squeezing the micro-gap, which can arise because of the non-adherence of the foam material, to the surface of the pipe or cable, the passage of water is prevented. This is to be regarded as surprising because, particularly on the basis of the disclosure of the EP-A-0 453 286, it could not have been anticipated in any way that the open pores of the foam, in the presence of the amounts of water-swellable filler used pursuant to the invention, could have been closed off to such an extent, that further entry of moisture is reliably prevented. Compared to the seals known from the DE-A-197 48 631, an advantage arises, which is particularly valued for the application purpose, namely the advantage that, in contrast to the teachings of this state of the art, it is not necessary to hold in position the fabric tube, containing the swellable material, by back-lining or fixing rings, in order by these means to achieve the aimed-for sealing effect since, pursuant to the invention, the function of fixing without additional measures is taken over directly by the plastic foam system, which is used pursuant to the invention. In this connection, it must doubtless be regarded as unexpected for the expert that, when the swellable polymer is incorporated as filler directly in the matrix of the plastic foam, the aimed-for sealing action nevertheless comes about and does so particularly with open-pore foams. With that, however, the aimed-for use leads to an unexpected and particularly advantageous technical effect.

The inventive teaching combines the advantages of conventional construction foam systems (simply and quickly used, universality with respect to the geometry of the openings, which are to be closed off, low costs) with the requirement of reliable, permanent sealing even in substrates, on which normally adhesion cannot be achieved.

The following examples explain the invention further.

EXAMPLE 1

Two-Component Polyurethane Cartridge Foam

The two components A and B of this two-component polyurethane foam contain the following constituents:
Component A
  49.0 parts by weight of a brominated polyether polyol with a hydroxy number of 580 and a functionality of 3.5
  40.7 parts by weight of a branched polyether polyol with a hydroxy number of 42 and a functionality of 3
  0.3 parts by weight of diazabicyclooctane
  1.0 parts by weight of pentamethyldiethylenetriamine
  3.0 parts by weight of water
  2.5 parts by weight of highly disperse silica
  3.5 parts by weight of a silicone glycol copolymer
  10 parts by weight of a swellable polymer (Cabloc CT).
Component B
  100 parts by weight of diphenylmethane diisocyanate (crude MDI)
  10 parts by weight of a swellable polymer (Cabloc CT).

The two components of the polymeric foam system are present separately in a two-chamber cartridge and are discharged by the processor over a static mixer, in which the components are mixed in a 1:1 ratio, discharged and foamed in the wall channel.

EXAMPLE 2

Two-Component Polyurethane Aerosol Can Foam

The two components A and B of this aerosol can foam have the following composition:
Component A
  91.7 g of a polyethylene glycol adipate with a hydroxy number of 56,
  33.4 g of a propoxylated polyol, started with glycerin and having a hydroxy number of 400,
  30.6 g of a propoxylated polyol, started with glycerin and having a hydroxy number of 42
  19.5 g of a polyethylene glycol having a molecular weight of 600
  8.3 g of a polyoxyalkylene glycol polysiloxane copolymer as a foam stabilizer
  2.8 g of di-(2-morpholinoethyl) ether
  91.7 g of trichloropropyl phosphate
  403.1 g of diphenylmethane diisocyanate (crude MDI)

73.7 g of tetrafluoroethane 40.3 g of dimethyl ether 20.9 g of butane 4.2 g of propane 156.0 g of swellable polymer (Cabloc CT)

Component B 20 g of monoethylene glycol.

Component A is transferred into the aerosol spray container. The second component B, which optionally may contain a blowing agent, such as dimethyl ether, is transferred into a separate chamber which, as an inner container, may be in the main aerosol can or may also be in a separate, second can.

For use, the two components are mixed so that the content of the container with component B (cross linker) is emptied into the main container, which contains component A, whereupon the contents are homogenized by shaking. However, it is also possible to use a two-component metering device, onto which the two containers for component A and component B are placed, whereupon the mixing takes place in a dispenser.

The cross linker of component B is such so that the hydroxyl groups contained are matched quantitatively to the isocyanate groups present in the prepolymer of component A, so that it is possible to do without the humidity of the surrounding air as cross-linking component.

In accordance with a further embodiment, component B also contains a blowing agent, such as tetrafluoroethane, dimethyl ether, butane and/or propane.

EXAMPLE 3

One-Component Polyurethane Aerosol Can Foam

In this case, the single component is present in a single aerosol spray can and comprises the following constituents:

91.7 g of a polyethylene glycol diadipate with a hydroxy number of 56

33.4 g of a polypropoxylated polyol, started with glycerin and having a hydroxy number of 400

30.6 g of a polypropoxylated polyol, started with glycerin and having a hydroxy number of 42

19.5 g of a polyethylene glycol with a molecular weight of 600

8.3 g of a polyoxyalkylene glycol polysiloxane copolymer as a foam stabilizer 2.8 g of di-(2-morpholinoethyl) ether 91.7 g of trichloropropyl phosphate 403.1 g of diphenylmethane diisocyanate (crude MDI)

73.7 g of tetrafluoroethane 40.3 g of dimethyl ether 20.9 g of butane 4.2 g of propane 156.0 g of swellable polymer (Cabloc CT)

Processing takes place from the one-component aerosol can by vigorously shaking and expelling the foam components into the opening that is to be sealed.

EXAMPLE 4

Two-Component Epoxide Resin Cartridge Foam

The constituents of components A and B of this two-component epoxide resin foam are the following:

Component A 100 g of a bisphenol A epichlorohydrin resin with an epoxide equivalent of 185

10 g of polydimethylmethylhydrogensiloxane 10 g of swellable polymer (Cabloc CT)

5 g of highly disperse silica ($SiO_2$)

Component B 19 g of m-xylylenediamine (amine equivalent of 34)

10 g of swellable polymer (Cabloc CT)

1 g of highly disperse silica ($SiO_2$)

The two components A and B are in separate containers of a two-chamber cartridge and, for use, are discharged over a static mixer, in which the components are mixed in a 1:1 ratio and caused to react.

EXAMPLE 5

Comparison Trials

The foam systems, given in the above Examples 1 to 4, are introduced into an annular gap with an external diameter of 100 mm (polymethyl methacrylate) and an internal diameter of 40 mm (polyethylene tube) up to a depth of about 10 cm, foamed and allowed to cure for 24 hours. After that, the foam is acted upon from one side by water under a pressure of 0.5 bar and the leakproofness of the wall channel was tested. For comparison, the same foam systems, however, without swellable polymer, were prepared and used in the same way.

The foams, used pursuant to the invention with the swellable polymer, remained satisfactorily leakproof. On the other hand, all foam systems, which did not have the filler that swells in the presence of water, leaked.

What is claimed is:

1. A method of sealing openings in buildings which communicate with outside, the method comprising the step of foaming in a opening a plastic foam system formed of one of a one-component polyurethane foam, a two-component polyurethane foam, a two-component epoxide resin foam, and a silicone foam, and containing an effective amount of at least one filler capable of swelling in the presence of water and formed as a water swellable homo-polymer or copolymer based on (meth)acrylic acid, (meth)acrylamide and/or (meth)acrylate in form of a cross-linked polyacrylic acid in a partially neutralized form.

2. A method according to claim 1, wherein the foaming step includes foaming a plastic foam system in which the water-swellable filler is formed as a homopolymer or copolymer, based on the cross-linked polyacrylic acid in form of a partial sodium salt.

3. A method according to claim 1, wherein the foaming step includes foaming a plastic foam system formed as an open-cell foam.

4. A method according to claim 1, the foaming step includes foaming a plastic foam system in which the water swellable filler, is contained in an amount of 1 to 40% by weight.

5. A method according to claim 4, wherein the water-swellable filler is contained in an amount of 5–30% by weight.

6. A method according to claim 5, wherein the water-swellable filler is contained in an amount of 10–20% by weight.

* * * * *